United States Patent
Nakazawa et al.

(10) Patent No.: US 12,159,374 B2
(45) Date of Patent: Dec. 3, 2024

(54) INFORMATION-PROCESSING DEVICE, INFORMATION-PROCESSING METHOD AND NON-TRANSITORY COMPUTER-READABLE INFORMATION RECORDING MEDIUM

(71) Applicant: RAKUTEN GROUP, INC., Tokyo (JP)

(72) Inventors: Mitsuru Nakazawa, Tokyo (JP); Bjorn Stenger, Tokyo (JP)

(73) Assignee: RAKUTEN GROUP, INC., Tokyo (JP)

( * ) Notice: Subject to any disclaimer, the term of this patent is extended or adjusted under 35 U.S.C. 154(b) by 0 days.

(21) Appl. No.: 18/005,056

(22) PCT Filed: Nov. 5, 2021

(86) PCT No.: PCT/JP2021/040851
§ 371 (c)(1),
(2) Date: Jan. 10, 2023

(87) PCT Pub. No.: WO2023/079702
PCT Pub. Date: May 11, 2023

(65) Prior Publication Data
US 2024/0249387 A1     Jul. 25, 2024

(51) Int. Cl.
*G06T 5/50* (2006.01)
(52) U.S. Cl.
CPC ...... *G06T 5/50* (2013.01); *G06T 2207/20221* (2013.01)
(58) Field of Classification Search
CPC ... G06T 5/50; G06T 7/00; G06T 2207/20221; H04N 1/00198; H04N 1/00196; H04N 1/387
See application file for complete search history.

(56) References Cited

U.S. PATENT DOCUMENTS

| | | |
|---|---|---|
| 2015/0062652 A1 | 3/2015 | Kawai et al. |
| 2018/0002010 A1* | 1/2018 | Bauer et al. ........... G05D 1/689 |

(Continued)

FOREIGN PATENT DOCUMENTS

| | | |
|---|---|---|
| DE | 102019131971 A1 * | 5/2021 |
| EP | 2894605 A1 | 7/2015 |

(Continued)

OTHER PUBLICATIONS

Office Action of Apr. 9, 2024, for corresponding JP Patent Application No. 2023-103153, pp. 1-4.

(Continued)

*Primary Examiner* — Jeffery A Brier
(74) *Attorney, Agent, or Firm* — HEA Law PLLC

(57) ABSTRACT

Provided is an information-processing device including: a CPU; and a memory storing instructions for causing the information-processing device, when executed by the CPU, to: select M (M≤N) images from N (N>1) images; generate a combined image by arranging the selected M images in M frames defined in advance, respectively; and determine a total assessment value in association with the generated combined image, the total assessment value including at least a linear sum of a selection assessment value being a linear sum of single image assessment values of the selected M images and a combination assessment value being a single image assessment value of the combined image.

11 Claims, 10 Drawing Sheets

(56) References Cited

U.S. PATENT DOCUMENTS

2018/0218526 A1    8/2018   Hayakawa
2021/0042976 A1    2/2021   Yamada et al.

FOREIGN PATENT DOCUMENTS

| EP | 3772848 A1 | 2/2021 |
|----|------------|--------|
| JP | 2015053542 A | 3/2015 |
| JP | 2015162850 A | 9/2015 |
| JP | 2018125660 A | 8/2018 |
| JP | 2021027555 A | 2/2021 |
| JP | 2021051595 A | 4/2021 |

OTHER PUBLICATIONS

Search Report of Jun. 27, 2023, for corresponding EP Patent Application No. 21950362.0, pp. 1-14.
International Search Report of Jan. 18, 2022, for International Patent Application PCT/JP2021/040851 pp. 1-10.

* cited by examiner (a)

(b)

(c)

(d)

(e)

(f)

INFORMATION-PROCESSING DEVICE, INFORMATION-PROCESSING METHOD AND NON-TRANSITORY COMPUTER-READABLE INFORMATION RECORDING MEDIUM

CROSS REFERENCE TO RELATED APPLICATIONS

The present disclosure contains subject matter related to that disclosed in International Patent Application PCT/JP2021/040851 under the Patent Cooperation treaty filed in the Japan Patent Office on Nov. 5, 2021, the entire contents of which are hereby incorporated by reference.

BACKGROUND OF THE INVENTION

1. Field of the Invention

The present invention relates to an information-processing device, an information-processing method, and a non-transitory computer-readable information recording medium.

2. Description of the Related Art

There is a demand for a combined image obtained by placing a plurality of images included in content in a predetermined arrangement, for example, a tile arrangement, in order to present this content including the plurality of images or to guide to this content. Examples of the combined image include a webpage design for a company or a store, an advertisement poster for a tourist resort or a travel package, an introduction of a movie or a game, and an introduction banner for a product relating to the electronic commerce. This combined image is generated by a designer selecting a required number of images and arranging those images at predetermined positions.

However, when the combined image is exhaustively generated by the designer, it is impossible to generate a large number of combined images, and a cost therefor is also a problem. However, even when an attempt is made to automatically generate such a combined image, it is difficult to obtain a combined image satisfying a quality demand by selecting images based on a certain criterion and simply arranging those images at predetermined positions. This is because, even when a quality of each of the selected images is worth independent appreciation, when those images are arranged side by side, a balance in color may be lost when the combined image is viewed as a whole. Moreover, a viewer may have a peculiar feeling for images which are included in the combined image and resemble one another, and hence the combined image may have a low quality.

As described above, there has hitherto not been known a technology for obtaining a high-quality combined image based on a plurality of images.

SUMMARY OF THE INVENTION

There is provided an information-processing device including: a CPU; and a memory storing instructions for causing the information-processing device, when executed by the CPU, to: select M (M≤N) images from N (N>1) images; generate a combined image by arranging the selected M images in M frames defined in advance, respectively; and determine a total assessment value in association with the generated combined image, the total assessment value including at least a linear sum of a selection assessment value being a linear sum of single image assessment values of the selected M images and a combination assessment value being a single image assessment value of the combined image.

There is also provided an information-processing method, causing a computer to execute: selecting M (M≤N) images from N (N>1) images; generating a combined image by arranging the selected M images in M frames defined in advance, respectively; and determining a total assessment value in association with the generated combined image, the total assessment value including at least a linear sum of a selection assessment value being a linear sum of single image assessment values of the selected M images and a combination assessment value being a single image assessment value of the combined image.

There is also provided a non-transitory computer-readable information recording medium storing an information-processing program for causing a computer to: select M (M≤N) images from N (N>1) images; generate a combined image by arranging the selected M images in M frames defined in advance, respectively; and determine a total assessment value in association with the generated combined image, the total assessment value including at least a linear sum of a selection assessment value being a linear sum of single image assessment values of the selected M images and a combination assessment value being a single image assessment value of the combined image.

DETAILED DESCRIPTION OF THE INVENTION

Figure 1:
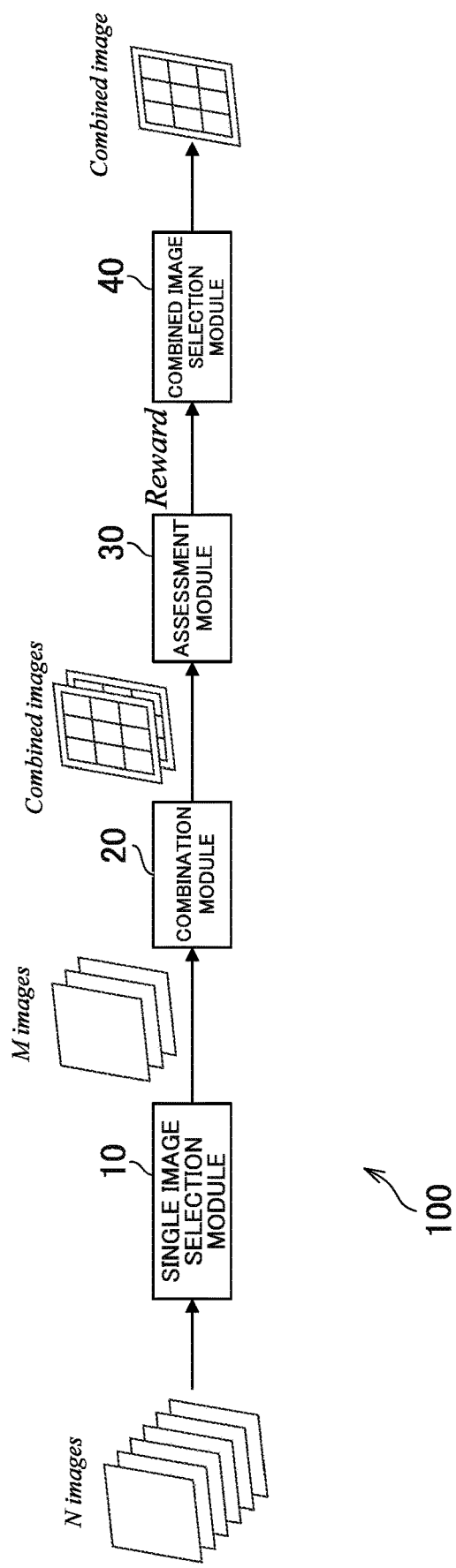
FIG. 1 is a functional conceptual diagram of an information-processing device according to a first embodiment of the present invention.

FIG. 1 is a functional conceptual diagram of an information-processing device 100 according to a first embodiment of the present invention. The information-processing device 100 is implemented by appropriate physical means, for example, a computer for executing an appropriate computer program, implementing functions of FIG. 1.

The information-processing device 100 includes a single image selection module 10, a combination module 20, an assessment module 30, and a combined image selection module 40. Moreover, the information-processing device 100 receives N images being target of information processing as input, and outputs a combined image. In this configuration, a relationship of N>1 is satisfied.

A brief description is now given of the information processing to be executed by the information-processing device 100. The N images are given images, and are an image group included in, for example, an image library or any content.

Moreover, what the information-processing device 100 is going to execute is to select M (M N) images from the N images and to arrange the M images in M frames defined in advance, to thereby contribute to generation of a combined image which is as high as possible in quality, that is, attracts a viewer so that an affirmative assessment is obtained. In this configuration, the obtained combined image varies depending on a method of selecting the M images from the N images and a method of arranging the selected M images in the M frames, and assessments therefor consequently vary.

Thus, the information-processing device 100 is configured to automatically (that is, through information processing by a computer) assess the obtained combined image without relying on the human, to thereby contribute to the generation of the combined image which is reasonably estimated to attract the viewer so that the affirmative assessment is obtained.

Figure 2:
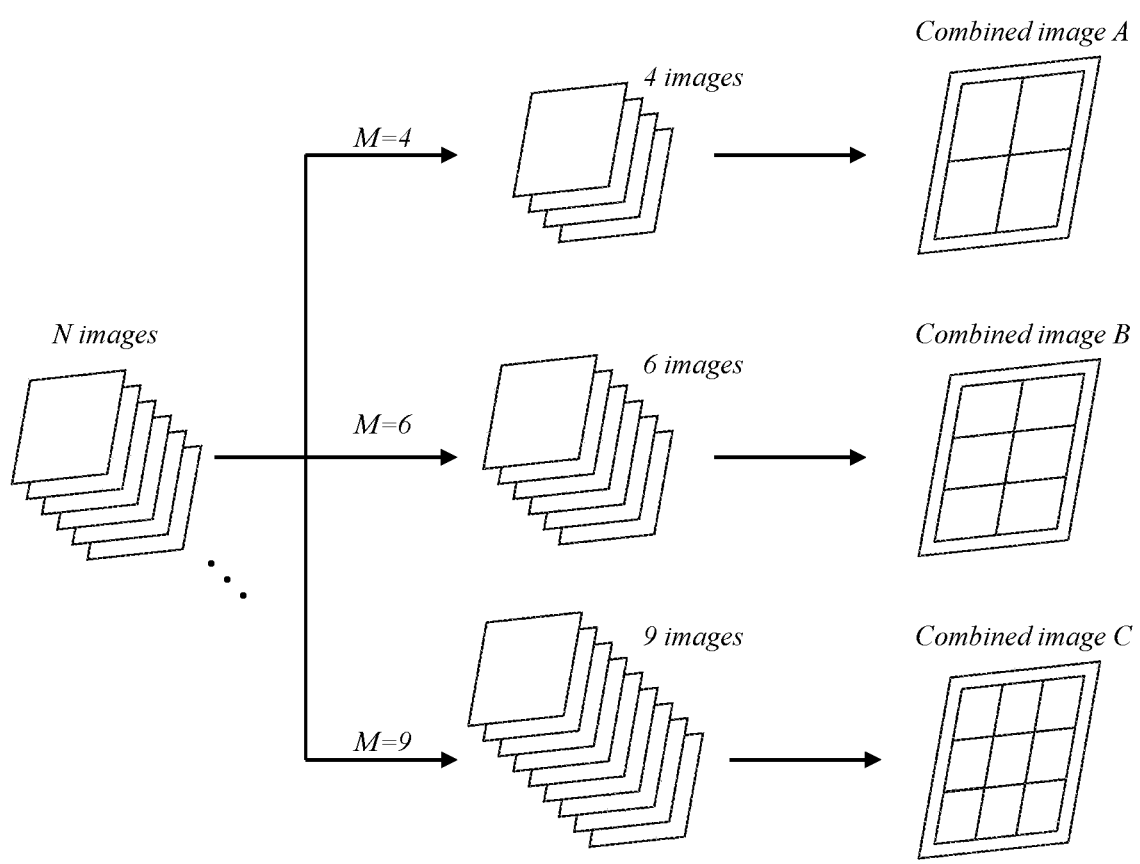
FIG. 2 is a diagram for schematically illustrating a process in which combined images are generated from N images for a plurality of values of M.

It should be noted that a value of M is not always a given constant value. FIG. 2 is a diagram for schematically illustrating a process in which the combined images are generated from the N images for a plurality of values of M. In this process, the value of M is assumed to be three types being 4, 6, and 9. A combined image A to a combined image C generated in accordance with the values of M are, as illustrated in the right side of FIG. 2, four images arranged in frames having a tile form of 2 vertically by 2 horizontally for M=4, six images arranged in frames having a tile form of 3 vertically by 2 horizontally for M=6, and nine images arranged in frames having a tile form of 3 vertically by 3 horizontally for M=9. This state is an example. The number of the types of the value of M and the number of frames may be more, and any arrangement of the frames may be adopted. For example, for M=4, four images can be arranged in frames having a tile form of 1 vertically by 4 horizontally. Moreover, for M=4, there may be both of the above-mentioned frames having the tile form of 2 vertically by 2 horizontally and the frames having the tile form of 1 vertically by 4 horizontally. The same applies to the cases of M=6, 9, and other values.

In this case, which of the combined image A to the combined image C attracts the attention of the viewer most depends on the prepared N images, and cannot unconditionally be determined.

This is because it is considered that images similar to one another (for example, photograph images obtained by taking the same dish or scenery at different angles) may be included in the N images, and hence, when, for example, the N images are divided into groups each formed of similar images and the number of groups is four, the combined image A can be formed of only images dissimilar to one another while the combined images B and C inevitably include images similar to one another, and may be unattractive as a whole. As another example, when the number of groups formed of similar images is many, for example, nine or more, the combined image C can present more various images while the combined images A and B may not convey appeal which the N images potentially have.

The same applies to combined images which are the same in the value of M and different in only the arrangement of the frames. Thus, the information-processing device 100 is configured to also assess combined images different in M and arrangement of the frames, and to finally generate, from those combined images, a combined image which is reasonably estimated to attract the viewer so that the affirmative assessment is obtained.

Figure 3:
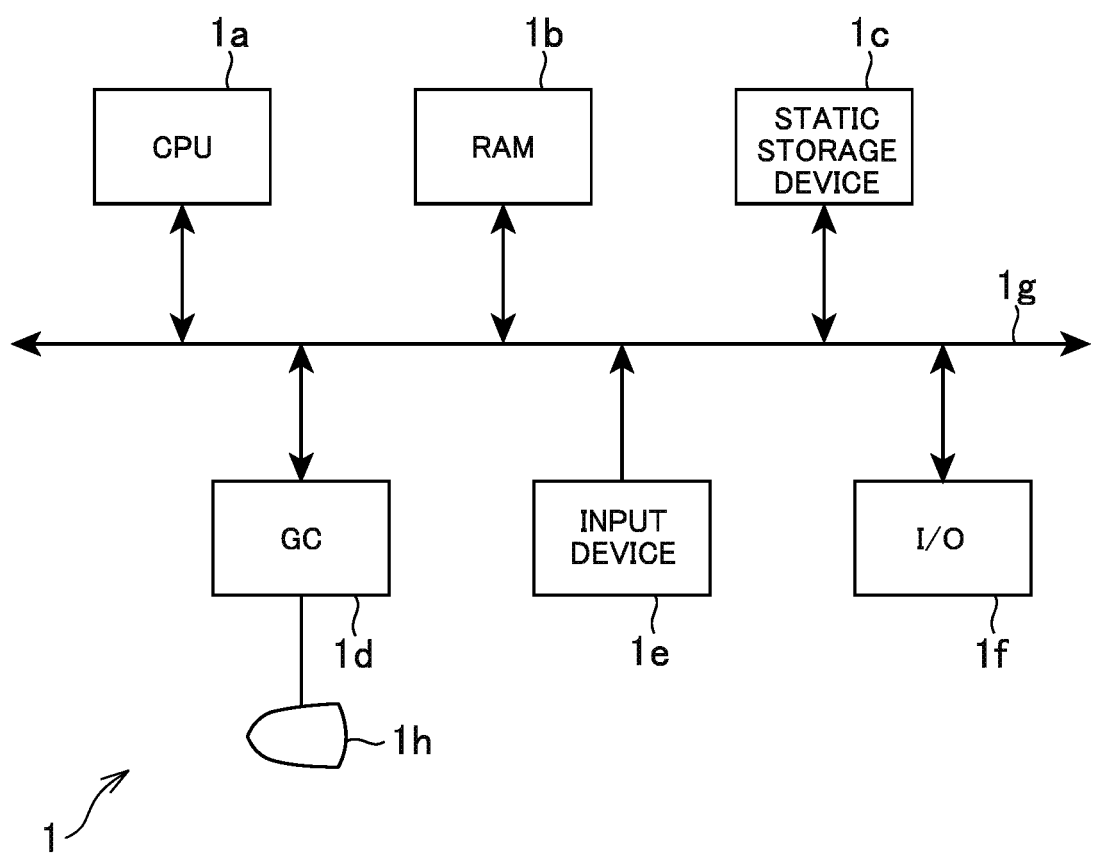
FIG. 3 is a configuration diagram for illustrating a representative physical configuration of a general computer.

The information-processing device 100 may be physically implemented through use of a general computer. FIG. 3 is a configuration diagram for illustrating a representative physical configuration of such a general computer 1.

In the computer 1, a central processing unit (CPU) 1a, a random access memory (RAM) 1b, a static storage device 1c, a graphics controller (GC) 1d, an input device 1e, and an input/output (I/O) if are connected through a data bus 1g so that electrical signals can mutually be transmitted and received. In this configuration, the static storage device 1c is a device which can statically record information, such as a hard disk drive (HDD) or a solid state drive (SSD). Moreover, the signal from the GC 1d is output to a monitor 1h for a user to visually recognize an image, such as a cathode ray tube (CRT) or a so-called flat panel display, and is displayed as an image.

The input device 1e is a device for the user to input information, such as a keyboard, a mouse, or a touch panel. The I/O if is an interface for the computer 1 to transmit and receive information to and from external devices. A plurality of CPUs 1a may be prepared so that parallel computing is executed in accordance with a load of the information processing required to be executed by the computer 1.

An information-processing program including an instruction sequence for causing the computer 1 to function as the information-processing device 100 is installed in the static storage device 1c, is read out onto the RAM 1b as required, and is executed by the CPU 1a. Moreover, this program may be recorded in an appropriate computer-readable information recording medium such as an appropriate optical disc, magneto-optical disc, or flash memory, and may then be provided, or may be provided through an information communication line such as the Internet. Moreover, the interface to be used by the user of the information-processing device 100 may be implemented on the computer 1 itself, and the user may directly operate the computer 1, may be implemented by a method of the so-called cloud computing in which general-purpose software such as a web browser is used on another computer and a function is provided from the computer 1 through the I/O 1f, or may further be implemented so that the computer 1 provides an application programing interface (API) available for another computer so that the computer 1 operates as the information-processing device 100 in response to a request from the another computer.

Each of the components of the information-processing device 100 of FIG. 1 may be implemented by the CPU 1c executing an appropriate information-processing program in the computer 1 or assigning an appropriate storage area to the RAM 1b and/or the static storage device 1c.

A simple and clear description is now given of the components of the information-processing device 100. The single image selection module 10 selects the M images from the N images. M at this time is equal to the number of frames of the combined image obtained by combining the selected images in the combination module 20. In this embodiment, the single image selection module 10 extracts possible combinations of the M images selected from the N images. Thus, when the number of such combinations is "k", the single image selection module 10 outputs "k" sets of M images.

Figure 4:
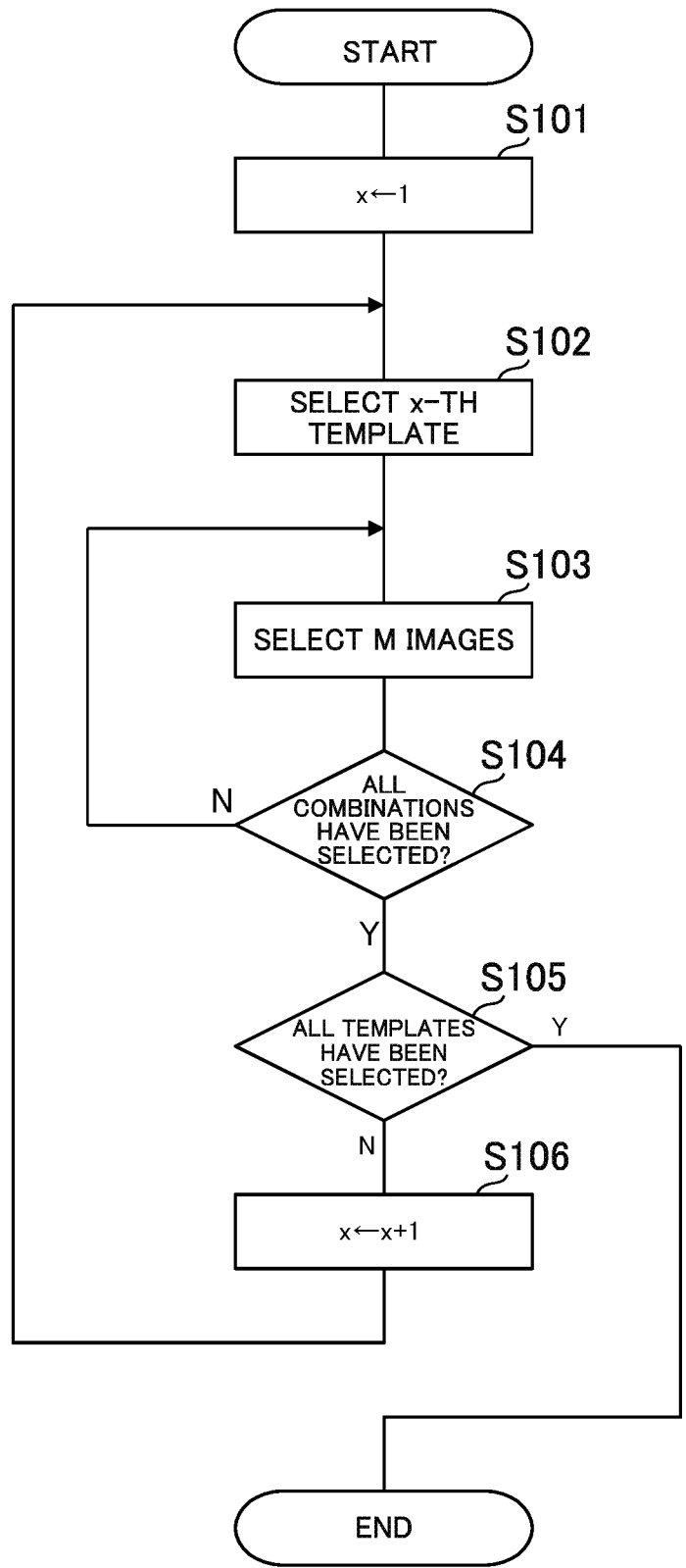
FIG. 4 is a flowchart for illustrating an example of a flow of an operation of a single image selection module in the first embodiment of the present invention.

FIG. 4 is a flowchart for illustrating an example of a flow of an operation of the single image selection module 10 in this embodiment. It is assumed that there are a plurality of types of templates of the combined image including the M frames, and the value of M is defined for each template.

First, the single image selection module 10 assigns an initial value of "1" to a variable "x" in Step S101, and subsequently selects an x-th template in Step S102. The M frames are set to the x-th template, and hence, in Step S103, the single image selection module 10 selects the M images from the N images such that the same combination is not selected.

In Step S104, it is determined whether or not all of possible combinations of the set of the M images have been selected. When all of the combinations have not been selected yet, the process returns to Step S103, and the M images are continuously selected. When all of the combinations have already been selected, the process proceeds to Step S105, and it is determined whether or not all of the plurality of templates have been selected.

When all of the templates have not been selected yet, the process proceeds to Step S106, "1" is added to the variable "x", and the process returns to Step S102. When all of the templates have already been selected, all of the possible combinations of the set of the M images have been selected for all possible values of M, and hence the processing is finished.

When there exist templates having the same value of M and being different from each other, there is no difference between the sets of the M images selected for those templates, and hence a load of the processing may be reduced by incorporating a result that has been already obtained.

Figure 5:
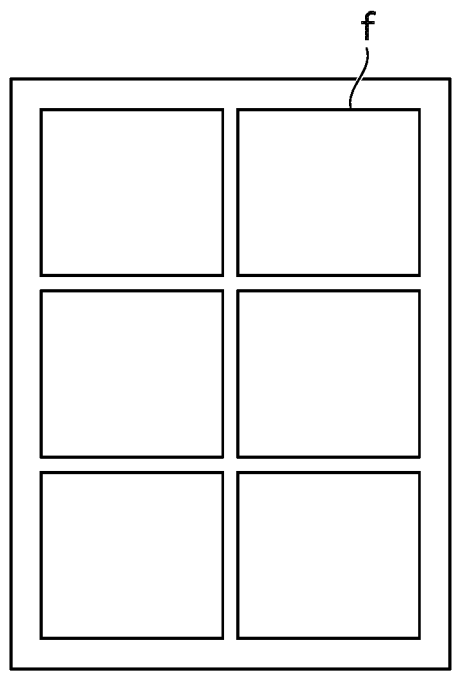
FIG. 5 is a diagram for illustrating various examples of a template.
Figure 5:
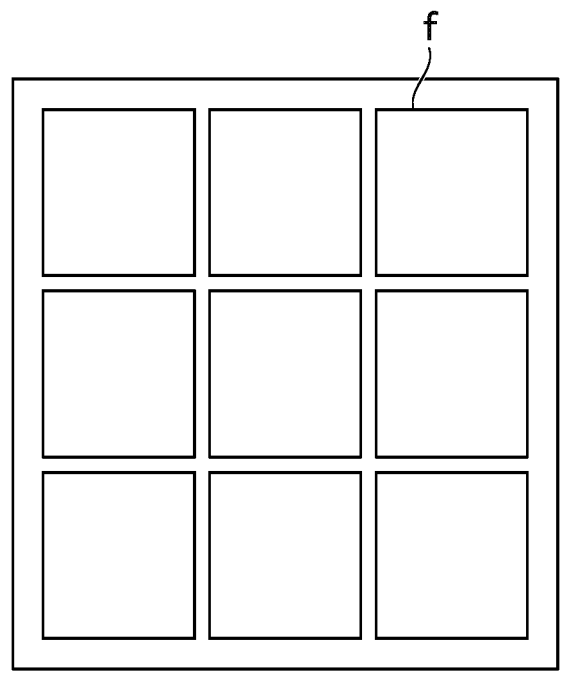
Figure 5:
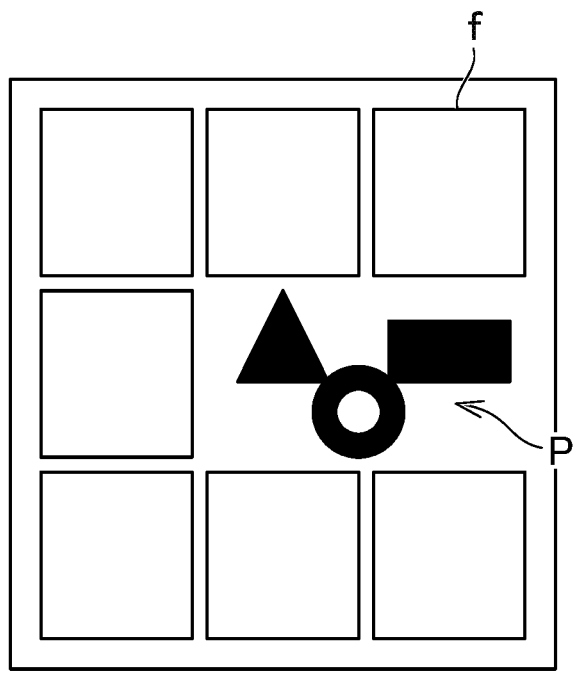
Figure 5:
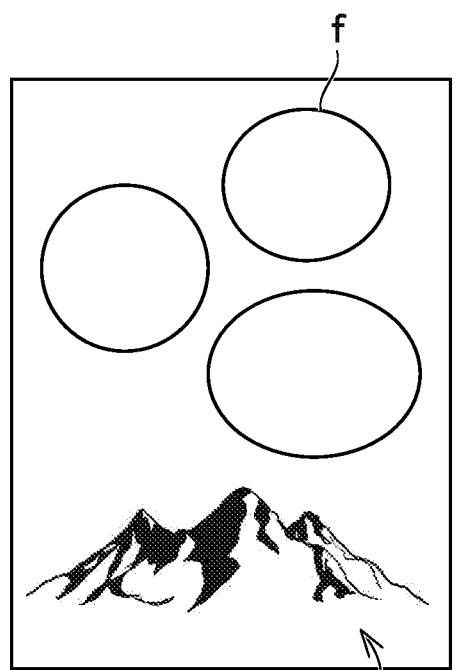

FIG. 5 is a diagram for illustrating various examples of the template. Each of part (a) and part (b) is an example in which rectangular regions are arranged in the tile forms as frames "f" for the images. In the template of part (a), six frames "f" are arranged as 3 vertically by 2 horizontally (only one reference symbol "f" is illustrated as a representative). In the template of part (b), nine frames "f" are arranged as 3 vertically by 3 horizontally. Moreover, the template of part (c) includes seven arranged rectangular frames "f" as well as a fixed image "p" arranged in advance in a portion other than the frames "f". Thus, a combined image generated through use of the template of part (c) includes the M selected images arranged in the M frames and the fixed image "p". The template of part (d) includes three arranged frames "f" different from one another in shape and size, in this example, a circle or an ellipsoid, and the fixed image "p" arranged in a lower portion.

As described above, any arrangement, number, and shape of the frames "f" may be adopted in the prepared templates, and the arrangement, the number, and the shape are not limited to those of part (a) and part (b) in which the rectangular frames "f" are regularly arranged in the tile forms. Moreover, in the templates, any fixed image "p" can be arranged in a portion other than the frames "f" as illustrated in part (c) and part (d). Thus, it is possible to generate a combined image including, for example, character information such as a company logo and a product name, design frames required for the convenience of design, and other images. Further, the quality of the combined image can be assessed as a whole including the fixed image "p".

Referring back to FIG. 1, the combination module 20 receives the set of the M images from the single image selection module 10, and arranges the selected M images in the M frames defined in advance in each template, respectively, to thereby generate combined images. In this case, there exist M! permutations for the arrangement of the M images in the M frames, and hence M! combined images different from one another are generated. The combination module 20 may determine, as combination information, the combinations each of which is received from the single image selection module 10 and is a combination of the set of M images and the arrangement of the M images in each template.

Figure 6:
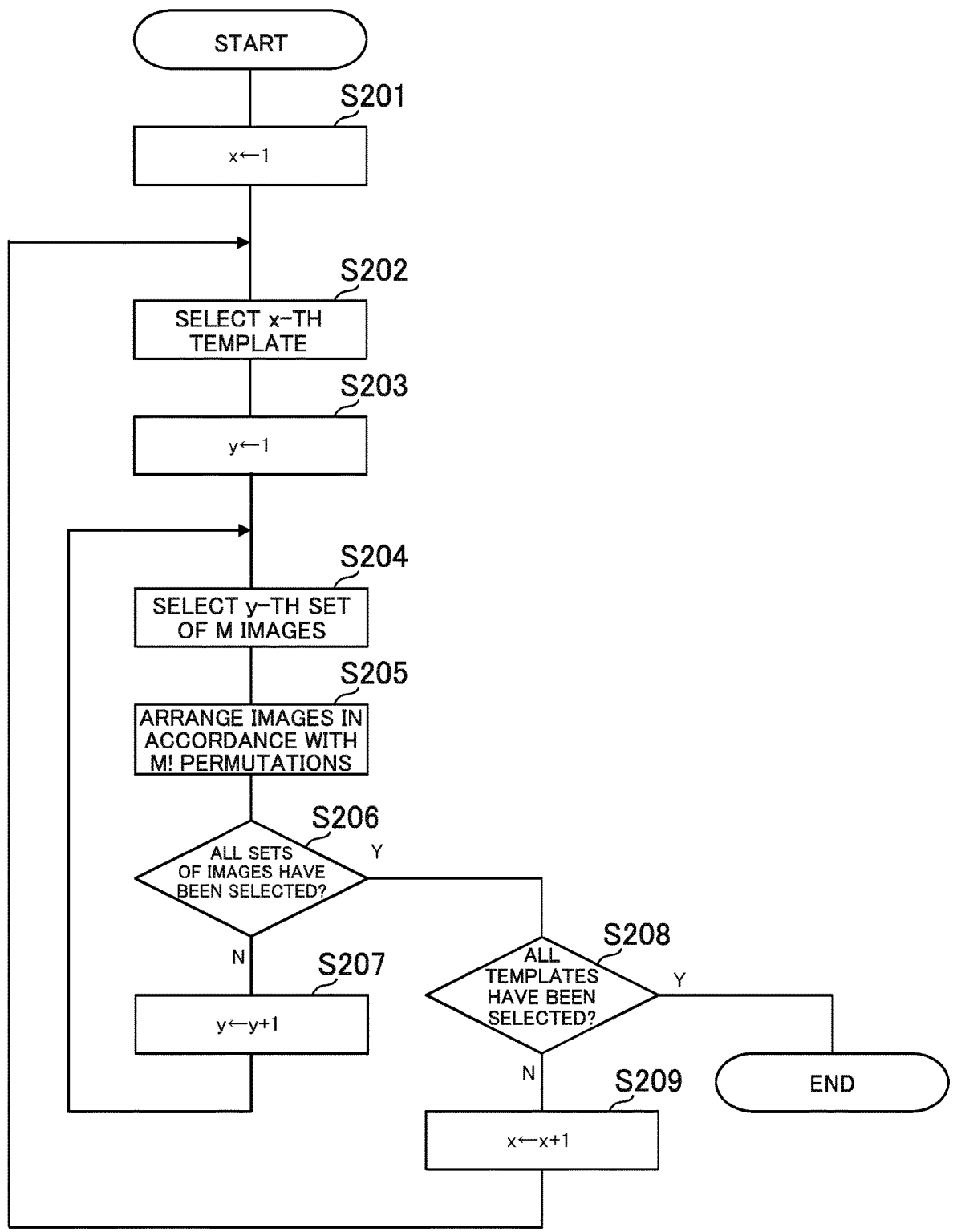
FIG. 6 is a flowchart for illustrating an example of a flow of an operation of a combination module in the first embodiment of the present invention.

FIG. 6 is a flowchart for illustrating an example of a flow of an operation of the combination module 20 in this embodiment. First, the combination module 20 assigns an initial value of "1" to the variable "x" in Step S201, and subsequently selects the x-th template in Step S202. The M frames are set to the x-th template, and the M! sets of the M images are selected by the single image selection module 10. Thus, in order to sequentially select those sets of the images, an initial value of "1" is assigned to a variable "y" in Step S203, and a y-th set of M images is subsequently selected in Step S204.

In Step S205, the combination module 20 arranges the selected M images in the M frames for the selected set of images in accordance with the M! permutations, to thereby generate M! combined images. In Step S206, it is subsequently determined whether or not all of the sets of the images have been selected for the selected x-th template. When all of the sets of the images have not been selected yet, "1" is added to "y" in Step S207. Then, the process returns to Step S204, and the processing is repeated.

When all of the sets of the images have already been selected, the process proceeds to Step S208, and it is determined whether or not all of the plurality of templates have been selected. When all of the templates have not been selected yet, the process proceeds to Step S209. Then, "1" is added to the variable "x", and the process returns to Step S202. When all of the templates have already been selected, the combined images related to all of the permutations have been generated for all of the sets of the images for all of the possible templates, and hence the processing is finished.

In the present application, when one image is treated as an independent image, this image is sometimes referred to as "single image." Each image included in the N images is treated as a "single image." Moreover, when a combined image generated by the combination module 20 is treated as one image independently of the original images and the template thereof, the combined image is treated as a "single image."

Referring back to FIG. 1, the assessment module 30 receives the combined images from the combination module 20, and determines, for each of the combined images, a total assessment value (Reward) in association with the generated combined image, and the total assessment value includes at least a linear sum of a selection assessment value being a linear sum of single image assessment values and a combination assessment value being a single image assessment value of the combined image. The assessment module 30 may receive the combination information from the combination module 20, and determines the total assessment value in association with the combination information.

The single image assessment value is an assessment value obtained when a certain image is viewed and is assessed as a single image. Thus, the selection assessment value included in the total assessment value means a linear sum of M assessment values each obtained by assessing, as viewed as a single image, each of the M images being a combination source of the combined image. Moreover, the combination assessment value is an assessment value obtained by assessing the combined image itself as one single image.

As a result, the total assessment value is given by the assessment module 30 to each of the combined images generated by the combination module 20 as the assessment thereof. As a result, it is possible to determine a more attractive combined image for the viewer based on this total assessment value.

For this purpose, the total assessment value is required to reasonably reflect attraction for the viewer of the combined image. A more specific description is now given of a method of determining the total assessment value in the assessment module 30.

In the assessment module 30 in this embodiment, the total assessment value Reward is determined as given by Expression 1.

$$\text{Reward} = \frac{\lambda_1}{M}\sum_{i=1}^{M} w_i \text{ Score}(I_i) + \lambda_2 \text{ Score}(I_{whole}) - \frac{\lambda_3}{{}_M C_2} \sum_{i,j=1, i \neq j}^{M} \text{Similarity}(I_i, I_j)$$ [Expression 1]

In this expression, $\lambda_1$, $\lambda_2$, and $\lambda_3$ are any weight coefficients, $w_i$ is a weight coefficient corresponding to an i-th frame, $I_i$ is an i-th image, $I_{whole}$ is the combined image, Score (I) is the single image assessment value of an image I, and Similarity ($I_i$, $I_j$) is a degree of closeness between the image $I_i$ and an image $I_j$.

The first term on the right side of Expression 1 indicates the selection assessment value. That is, the M selected images are distinguished from one another by assigning numbers of from 1 to M thereto. A sum of products each obtained by multiplying a single image assessment value Score ($I_i$) of the i-th image $I_i$ by any weight coefficient $w_i$, that is, a liner sum, is used as the selection assessment value. The weight coefficient $\lambda_1$ specifies a weight of the selection assessment value in the entire total assessment value Reward. The coefficient 1/M is a normalization coefficient.

The selection assessment value presents a higher value as each single image assessment value Score($I_i$) for the image $I_i$ becomes higher. That is, as more images each having a higher assessment as a single image are selected, the selection assessment value becomes higher. Meanwhile, without the normalization, a magnitude of the selection assessment value depends on the number M of selected images. That is, as a combined image uses more images as the source of the combination, the selection assessment value increases.

In view of this, as a result of the multiplication of the normalization coefficient, the selection assessment value is the value independent of the value of M. The normalization coefficient is a function of M, and is given as "g" satisfying Expression 2.

$$af(I) = g\left(\sum^{M} f(I)\right), \forall I$$ [Expression 2]

In this expression, f(I) is any assessment function which gives a non-zero assessment value for the image I, and "a" is any non-zero real number.

Thus, the assessment module 30 normalizes the selection assessment value based on M being the number of selected images. The coefficient a/M as the normalization coefficient "g" satisfies Expression 2, and the above-mentioned coefficient 1/M corresponds to a case in which a=1.

Moreover, the weight coefficient $w_i$ is defined for each frame of the template. That is, in a certain template, a larger value may be defined for a frame at a position considered to be more important for the viewer, and a smaller value may be defined for a frame at a position considered to be relatively less important.

Figure 7:
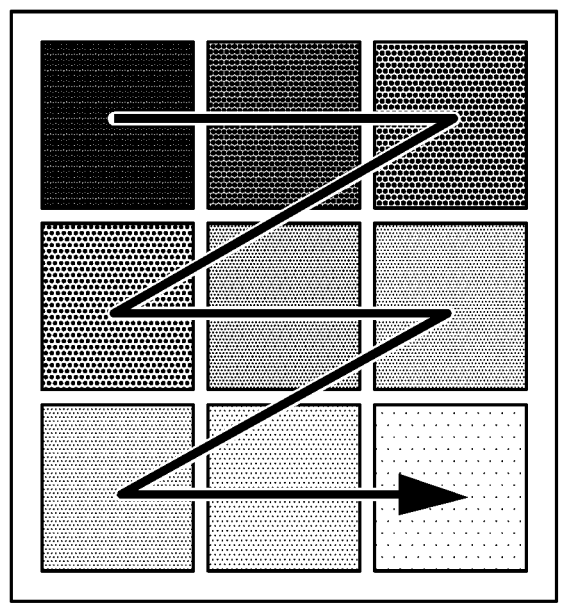
FIG. 7 is a diagram for illustrating setting examples of a weight coefficient $w_i$.
Figure 7:
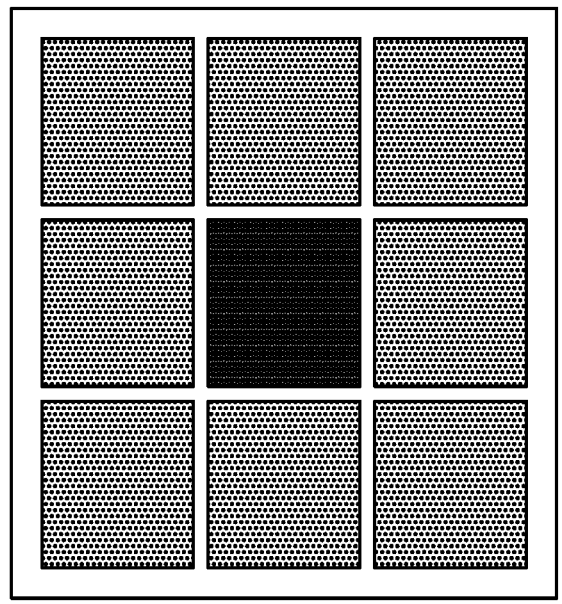

FIG. 7 is a diagram for illustrating setting examples of the weight coefficient $w_i$. A template of part (e) of FIG. 7 includes nine rectangular frames arranged in the 3×3 tile form. A frame having a darker color indicates that the value of the weight coefficient $w_i$ is larger. This template assumes a scene of use in which the viewer looks at each image arranged in the frame in the obtained combined image sequentially from an upper left image to a lower right image. In a sequence indicated by the arrow of the diagram, a larger value of the weight coefficient $w_i$ is given as the position becomes closer to the frame on the upper left frame as viewed as facing the diagram, and a smaller value of the weight coefficient $w_i$ is given as the position becomes closer to the frame on the lower right frame.

The template of part (f) of FIG. 7 also includes nine rectangular frames arranged in the 3×3 tile form. This template assumes a scene of use in which the viewer looks the entire combined image as one image. A larger value of the weight coefficient $w_i$ is given to a center frame considered to be a center of the line of sight of the viewer. A relatively smaller value of the weight coefficient $w_i$ is given to frames arranged in a periphery.

Thus, the assessment module 30 determines the selection assessment value based on the single image assessment value Score($I_i$) of each of the selected M images and the weight coefficient $w_i$ corresponding to each of the M frames defined in advance in the template.

The second term on the right side of Expression 1 indicates the combination assessment value. That is, the second term is obtained by multiplying the assessment value Score($I_{whole}$) at the time when a combined image $I_{whole}$ is viewed as a single image by the weight coefficient $\lambda_2$ for specifying a weight of the selection assessment value in the entire total assessment value Reward.

The combination assessment value means a numerical assessment of attraction for the viewer at the time when the combined image is viewed as a single image independently of the individual images forming the combined image. Thus, it is considered that the combination assessment value presents a higher value as balances in colors and details become more excellent as the entire combined image independently of contents of the individual images.

Description is now given of a specific method of giving the single image assessment value Score(I) for the image I. Any method may be used as long as the method reasonably gives the single image assessment value for the predetermined image I as the attraction at the time when the predetermined image I is viewed as an image alone. Description is now given of a method of giving the single image assessment value through use of any one of an assessment value called "aesthetic value" and an assessment value called "click through rate (CTR) prediction value," or both thereof simultaneously.

Both of the aesthetic value and the CTR prediction value can be obtained by inputting the image I into a learned machine learning model. As learning data for obtaining a machine learning model which outputs the aesthetic value, learning data disclosed on the Internet for free or for a fee already exists for research purpose and practical applications. Thus, this learning data is used to train the machine learning model implemented by, for example, a convolutional neural network (CNN), to thereby be capable of easily obtain the learned machine learning model. A machine learning model which outputs the CTR prediction value can be obtained by using, as learning data, a set of an image and a CTR obtained for this image to similarly train a machine learning model implemented by, for example a CNN. The learning data for training a machine learning model as the machine learning model which outputs the CTR prediction value can be obtained by calculating, for various images used in, for example, an electronic commerce (EC) website, a ratio of the number of clicks (selections) on an image by a user to the number of times of display of this image for the user (the number of impressions).

The assessment module 30 inputs the image I into each of the machine learning models, to thereby be capable of acquiring single image assessment values corresponding to the input image I, which is a selected image or a combined image in this case. In this embodiment, the single image assessment value is obtained as a linear sum of the aesthetic value represented by $\text{Score}_{Aesthetic}(I)$ and the CTR prediction value represented by $\text{Score}_{CTR}(I)$ which are obtained for the image I. That is, the single image assessment value Score(I) is obtained as given by Expression 3.

$$\text{Score}(I) = w_{Aesthetic} \ \text{Score}_{Aesthetic}(I) + w_{CTR} \ \text{Score}_{CTR}(I) \quad \text{[Expression 3]}$$

In this expression, $W_{Aesthetic}$ and $W_{CTR}$ are any weighting coefficients.

When the single image assessment value Score(I) is to be obtained, the aesthetic value or the CTR prediction value may solely be used, or another assessment value may be used.

The third term on the right side of Expression 1 indicates a similarity assessment value. The similarity assessment value indicates similarity between the selected images. In this example, when the selected M images are distinguished from one another by assigning the numbers of from 1 to M, the similarity assessment value has a higher value as more images similar to each other are included in those M images.

The similarity assessment value is obtained by multiplying a sum of the similarities each between the i-th image $I_i$ and the j-th image $I_j$, that is, the degrees of closeness Similarity $(I_i, I_j)$ which indicate degrees of resemblance, by the weighting coefficient $A_3$ and a normalization coefficient $1/{_M}C_2$. The weight coefficient $A_3$ specifies a weight of the similarity assessment value in the entire total assessment value Reward.

Thus, the similarity assessment value presents a higher value as more pairs of images similar to each other are included in the M selected images, and as this pair of images are more similar to each other. When the combined image is generated, and images similar to each other are included, redundant impression is given to the viewer, and hence the attraction of the generated combined image is spoiled more as the similarity assessment value increases. Thus, in Expression 1, the sign of the similarity assessment value is negative, and the value of the total assessment value Reward decreases as the value of the similarity assessment value increases.

In the similarity assessment values, as many degrees of closeness Similarity $(I_i, I_j)$ as the number of combinations of any two images selected from the M images are obtained. This number of combinations is ${_M}C_2$, and hence the normalization coefficient used in this example is a reciprocal of this number of combinations, which is $1/{_M}C_2$. This normalization coefficient also satisfies Expression 2.

As a specific method of giving the degree of closeness Similarity $(I_i, I_j)$ between the images $I_i$ and $I_j$, a method used in any known image processing technology may be employed. As such a method, there are exemplified a method of using a deep neural network (DNN) such as the CNN or another machine learning model, a method of using a distance between image feature amount vectors, and a method of a combination of those methods. In this embodiment, a machine learning model based on the CNN is used to obtain the degree of similarity.

As given by Expression 1, the total assessment value Reward is the linear sum of the above-mentioned selection assessment value, combination assessment value, and similarity assessment value. The terms are linearly combined while the signs of the selection assessment value and the combination assessment value are positive and the sign of the similarity assessment value is negative. Accordingly, the total assessment value Reward presents a higher value as the selection assessment value and the combination assessment value present higher values, and the total assessment value Reward presents a lower value as the similarity assessment value presents a higher value. That is, as the assessment value of each of the individual images selected to form the combined image becomes higher, and the assessment value at the time when the entire combined image is viewed as a single image becomes higher, the total assessment value Reward is assessed higher. Moreover, as more images similar to each other are included in the images forming the combined image, and as the images are more similar to each other, the total assessment value Reward is assessed lower.

The appeal of the obtained combined image to the viewer can reasonably and quantitatively be assessed by designing the total assessment value Reward as described above. A specific expression for obtaining the total assessment value Reward may be different from the expression given in this embodiment. For example, an assessment value at the time when a subset of the images included in the combined image are viewed as a single image may be considered, and the similarity assessment value may not be considered. As another example, for the similarity assessment value, appropriate weighting may be executed so that the degree of closeness between images arranged at positions closer to each other, for example, images next to each other, have higher influence.

Figure 8:
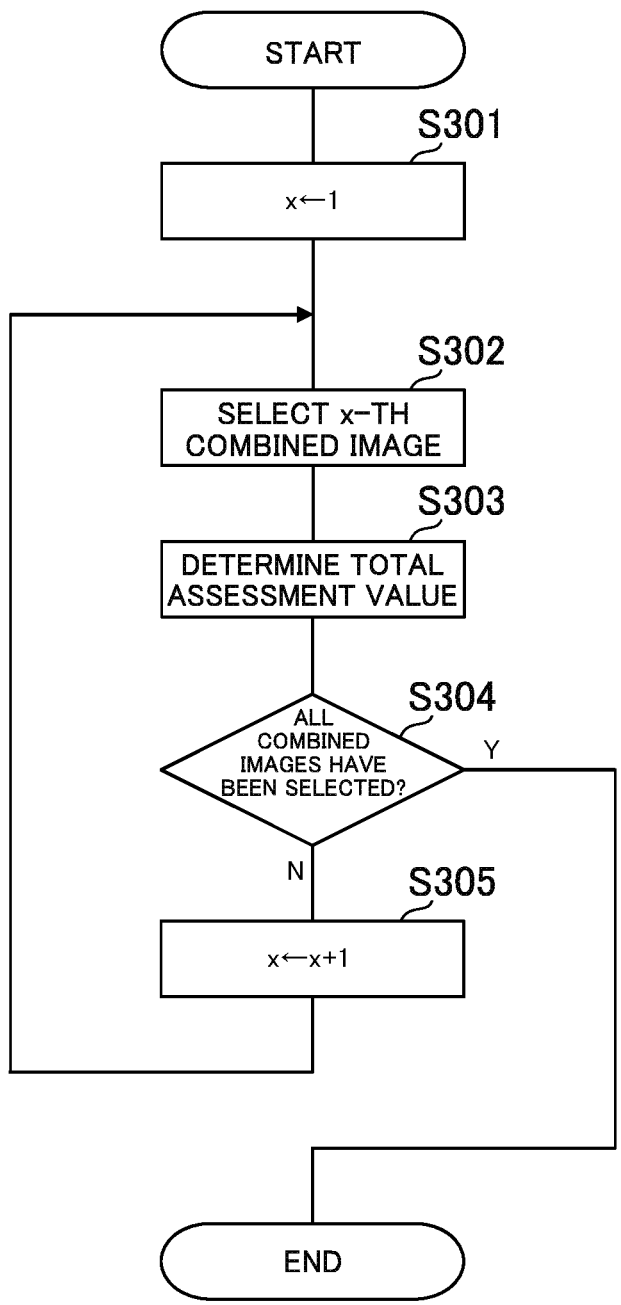
FIG. 8 is a flowchart for illustrating an example of a flow of an operation of an assessment module in the first embodiment of the present invention.

FIG. 8 is a flowchart for illustrating an example of a flow of an operation of the assessment module 30 in this embodiment. First, the assessment module 30 assigns an initial value of "1" to the variable "x" in Step S301, and subsequently selects an x-th combined image in Step S302. In Step S303, the total assessment value Reward of the selected x-th combined image is determined based on Expression 1.

In Step S304, it is subsequently determined whether or not all of the combined images have been selected. When all of the combined images have not been selected yet, "1" is added to "x" in Step S305. Then, the process returns to Step S302, and the processing is repeated. When all of the combined images have already been selected, the total assessment values Reward have been determined for all of the combined images, and hence the processing is finished.

Referring back to FIG. 1, the assessment module 30 gives the total assessment values Reward to the combined images generated by the combination module 20 in association therewith. The combined image selection module 40 selects at least one combined image based on the total assessment values Reward. The combined image selection module 40 may select at least one piece of combination information based on the total assessment values Reward, and may generate a combined image based on the selected combination information.

Most simply, it is only required to select a combined image presenting the highest total assessment value Reward. As another operation, any number of, for example, ten combined images having highest total assessment values Reward may be presented, to thereby allow the user to select a combined image.

Figure 9:
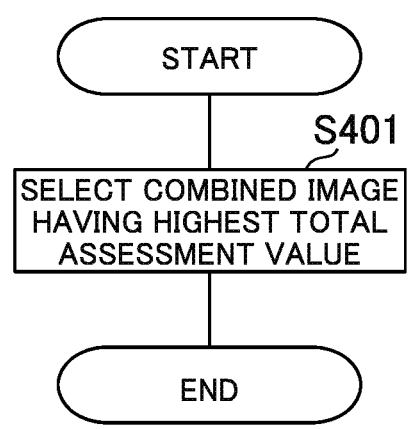
FIG. 9 is a flowchart for illustrating an example of a flow of an operation of a combined image selection module in the first embodiment of the present invention.

FIG. 9 is a flowchart for illustrating an example of a flow of an operation of the combined image selection module 40 in this embodiment. The combined image selection module 40 in this embodiment simply selects the combined image presenting the highest total assessment value Reward, and hence it is only required to select such a combined image in Step S401 and to finish the operation.

In the description given above, for the convenience of description, the operation of each functional block of FIG. 1 is described as self-contained. That is, the operation of the single image selection module 10 is self-contained within the single image selection module 10, and the subsequent description is given in the same manner. However, the operations are not required to be as described, and the operations of the respective functional blocks of FIG. 1 may sequentially be executed. For example, when one set of M images are selected in the single image selection module 10, the selected M images may immediately be passed to the combination module 20, to thereby generate the combined images of the passed M images. Similarly, when one combined image is generated in the combination module 20, the generated combined image may immediately be passed to the assessment module 30, to thereby determine the total assessment value thereof.

In the information-processing device 100 according to the first embodiment described above, the information-processing device 100 selects all of the possible combinations of the M images for the given N images, and obtains the combined images for all of the permutations for arranging the images in the template for each of the sets of the M images, to thereby determine the total assessment values thereof. This method is excellent in a point that it is possible to obtain the combined image having the possible maximum total assessment value, but there is such a disadvantage that, when the number N increases, the number of combined images each for which the total assessment value is to be determined exponentially increases, and a calculation load for the information processing increases.

Figure 10:
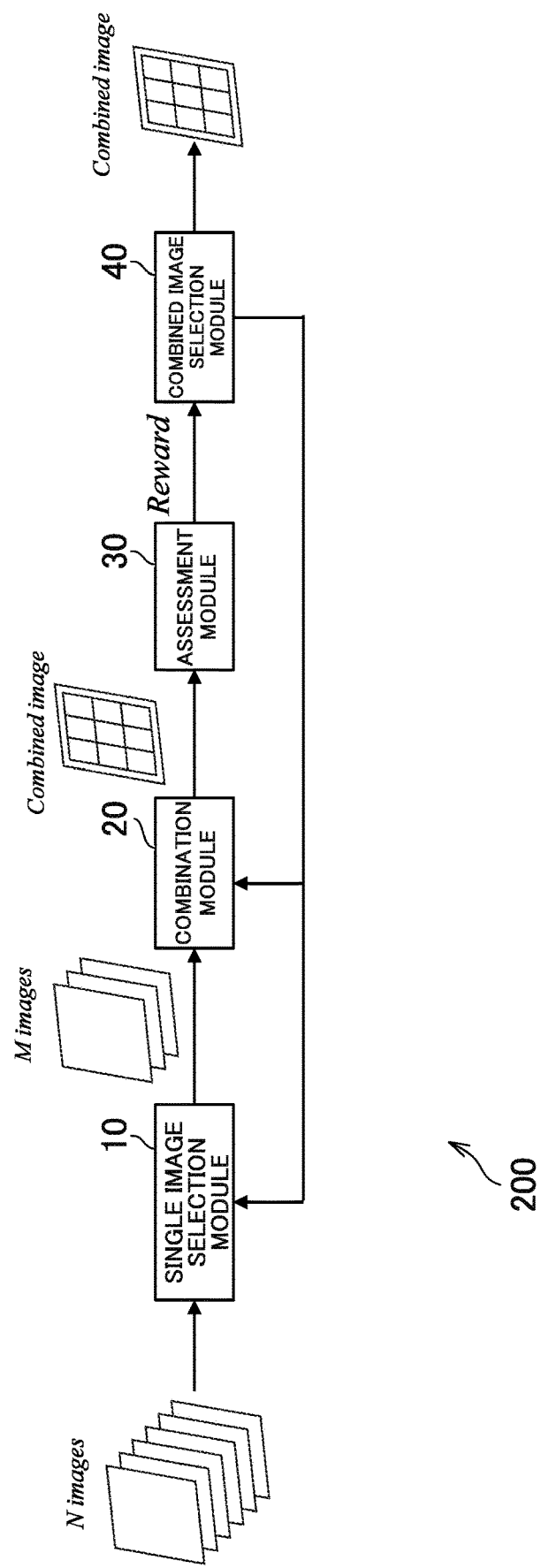
FIG. 10 is a functional conceptual diagram of an information-processing device according to a second embodiment of the present invention.

In view of this, in an information-processing device 200 of FIG. 10 according to a second embodiment of the present invention, it is intended to select a combined image presenting a reasonably high total assessment value with a smaller calculation load. In the information-processing device 200, components common or corresponding to those of the information-processing device 100 according to the first embodiment are denoted by the same reference symbols. In the following, description is given of only points different from the information-processing device 100 according to the first embodiment, and the description given of the first embodiment is incorporated for common points.

The information-processing device 200 is configured to find, through search, a combined image which gives the highest total assessment value or is considered to give the highest total assessment value by using a specific algorithm to sequentially determine a combined image to be generated and assessed based on known total assessment values of one or a plurality of known combined images without determining the total assessment values for all possible combined images.

That is, the combined image selection module 40 of the information-processing device 200 is configured to specify a set of the M images to be selected next by the single image selection module 10, and to specify a permutation for the arrangement of the images to be selected next by the combination module 20 based on the combined images already obtained and the total assessment values thereof. As a result, the total estimation values are first obtained for combined images for one or a plurality of sets of M images freely selected and the permutations of the arrangement of those images on the template, and a combined image presenting a higher total assessment value is subsequently searched for based on the obtained total assessment values.

As such a method, there may be used various algorithms such as the simplex method and the Karmarkar's algorithm in the linear programming and various algorithms such as the hill-climbing method, the best-first search, and the A* algorithm in the heuristic search. Thus, the information-processing device 200 according to the second embodiment is useful in obtaining a combined image attractive for the viewer with a reasonable calculation time and calculation load when the number N of given images is large, when the number of permutations of the image arrangement is large, or when the number M of frames included in each template is large. Meanwhile, when the information-processing device 100 according to the first embodiment is used in a case in which N and M are relatively small values, there is provided an advantage that it is guaranteed that the optimal combined image is obtained.

What is claimed is:

1. An information-processing device, comprising:
a CPU; and
a memory storing instructions for causing the information-processing device when executed by the CPU, to:
select M (M≤N) images from N (N>1) images;
generate a combined image by arranging the selected M images in M frames defined in advance, respectively; and
determine a total assessment value in association with the generated combined image, the total assessment value including at least a linear sum of a selection assessment value being a linear sum of single image assessment values of the selected M images and a combination assessment value being a single image assessment value of the combined image.

2. The information-processing device according to claim 1, wherein the instructions further cause the information-processing device to:
normalize the selection assessment value based on M being the number of selected images, to thereby determine the total assessment value of each of a plurality of the combined images different in M.

3. The information-processing device according to claim 1, wherein the instructions further cause the information-process device to:

determine the selection assessment value based on the single image assessment value of each of the selected M images and a weight coefficient corresponding to each of the M frames defined in advance.

4. The information-processing device according to claim 1, wherein the total assessment value further includes a linear sum of similarity assessment values each indicating similarity between the selected images.

5. The information-processing device according to claim 4, wherein the instructions further cause the information-processing device to:
normalize the similarity assessment values based on M being the number of selected images, to thereby determine the total assessment value of each of a plurality of the combined images different in M.

6. The information-processing device according to claim 5, wherein the total assessment value Reward is given by the following expression:

$$\text{Reward} = \frac{\lambda_1}{M}\sum_{i=1}^{M} w_i \ \text{Score}(I_i) + \lambda_2 \ \text{Score}(I_{whole}) - \frac{\lambda_3}{{}_M C_2} \sum_{i,j=1, i \neq j}^{M} \text{Similarity}(I_i, I_j)$$

[Expression 1]

where:
$\lambda_1$, $\lambda_2$, and $\lambda_3$ are any weight coefficients;
$W_i$ is a weight coefficient corresponding to an i-th frame;
$I_i$ is an i-th image;
$I_{whole}$ is the combined image;
Score (I) is the single image assessment value of an image I; and
Similarity ($I_i$, $I_j$) is a degree of closeness between the image $I_i$ and an image $I_j$.

7. The information-processing device according to claim 1, wherein the combined image includes a fixed image arranged in advance in a portion other than the M frames.

8. The information-processing device according to claim 1, wherein the instructions further cause the information-processing device to:
input the selected image or the combined image into a machine learning model, to thereby acquire the single image assessment value corresponding to the input selected image or the combined image.

9. The information-processing device according to claim 1, wherein the instructions further cause the information-processing device to:
select at least one combined image as the combined image based on the total assessment value.

10. An information-processing method, causing a computer to execute:
selecting M (M≤N) images from N (N>1) images;
generating a combined image by arranging the selected M images in M frames defined in advance, respectively; and
determining a total assessment value in association with the generated combined image, the total assessment value including at least a linear sum of a selection assessment value being a linear sum of single image assessment values of the selected M images and a combination assessment value being a single image assessment value of the combined image.

11. A non-transitory computer-readable information recording medium storing an information-processing program for causing a computer to:
select M (M≤N) images from N (N>1) images;
generate a combined image by arranging the selected M images in M frames defined in advance, respectively; and
determine a total assessment value in association with the generated combined image, the total assessment value including at least a linear sum of a selection assessment value being a linear sum of single image assessment values of the selected M images and a combination assessment value being a single image assessment value of the combined image.

* * * * *